Oct. 29, 1968  A. K. ANTONSEN ETAL  3,407,790
UNIFLOW SCAVENGED ENGINE HAVING IMPROVED
GASEOUS FUEL ADMISSION
Filed April 12, 1967  3 Sheets-Sheet 1
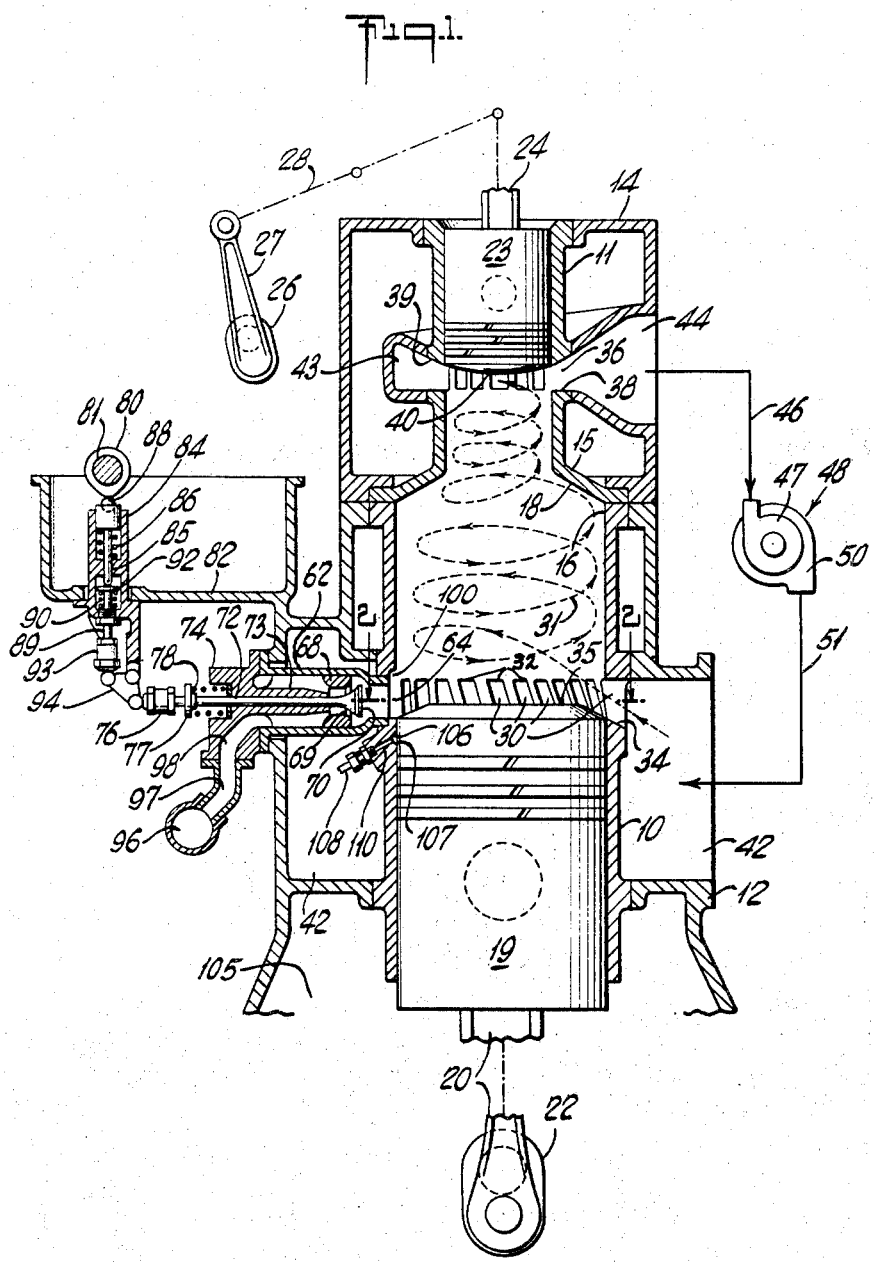
INVENTORS
ANKER K. ANTONSEN
MATTHEW L. FOREMAN
BY George A. Woodruff
ATTORNEY Oct. 29, 1968  A. K. ANTONSEN ETAL  3,407,790
UNIFLOW SCAVENGED ENGINE HAVING IMPROVED
GASEOUS FUEL ADMISSION
Filed April 12, 1967  3 Sheets-Sheet 2
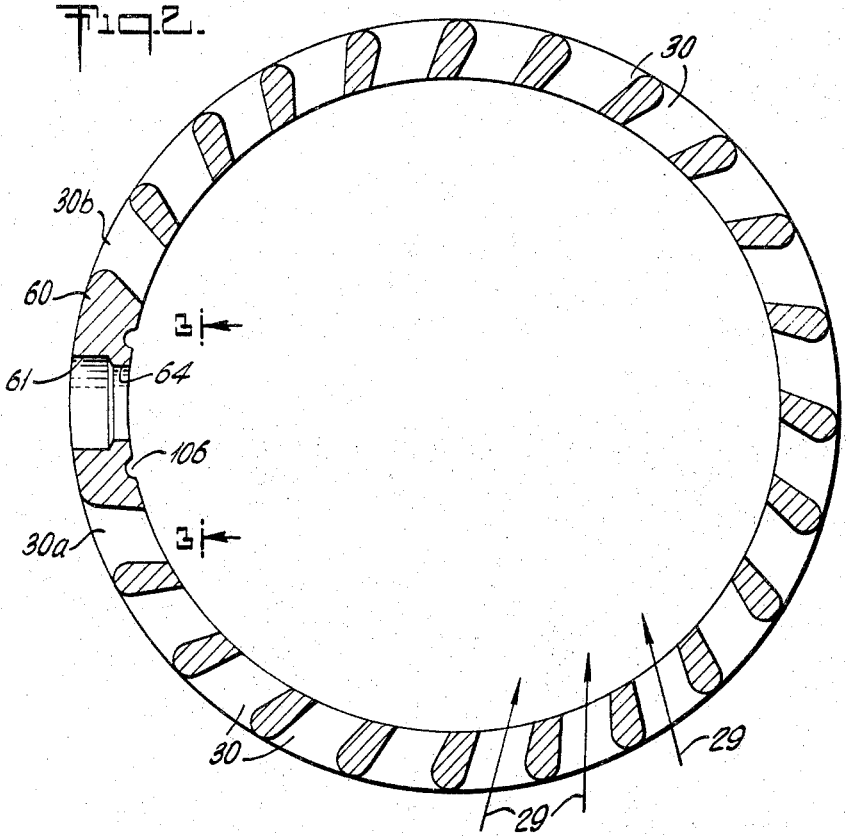
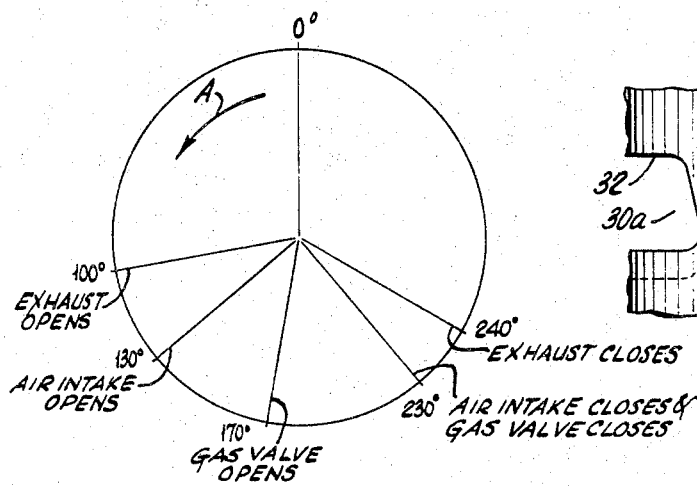
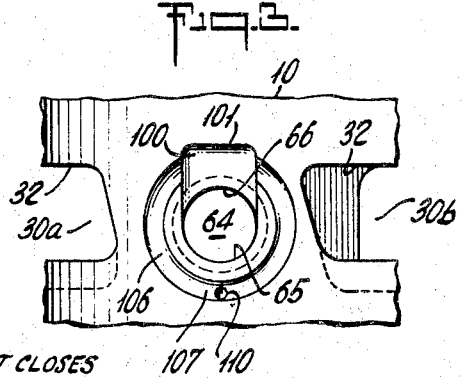
INVENTORS
ANKER K. ANTONSEN
MATTHEW L. FOREMAN
BY George A. Woodruff
ATTORNEY

United States Patent Office 3,407,790
Patented Oct. 29, 1968

3,407,790
UNIFLOW SCAVENGED ENGINE HAVING IMPROVED GASEOUS FUEL ADMISSION
Anker K. Antonsen, 2137 E. Ridge Road, and Matthew L. Foreman, 845 Harrison Ave., both of Beloit, Wis. 53511
Filed Apr. 12, 1967, Ser. No. 630,233
4 Claims. (Cl. 123—65)

ABSTRACT OF THE DISCLOSURE

A uniflow scavenged internal combustion engine including piston controlled cylinder air admission ports in a circumferential series and directed to establish helical air flow in the cylinder, operable on gaseous fuel and having fuel admission port means in the cylinder between an adjacent pair of the air ports for fuel delivery into the cylinder in the zone of the air ports, whereby to attain improved air-fuel mixture. The provision in such engine of means for preventing gaseous fuel leakage past the piston to the engine crankcase.

---

This invention relates to internal combustion engines operable on gaseous fuel, and has particular reference to an improved gaseous fuel admission arrangement which is especially suitable for but not limited to, two cycle uniflow scavenged engines of opposed piston type having piston controlled air and exhaust ports. The present improvements are of particular advantage in application to a supercharged dual-fuel or so-called gas-diesel engine of the character indicated, wherein ignition of the gaseous fuel charge is attained by compression ignition of a small or pilot quantity of liquid fuel, as oil.

It is usual practice in engines of the opposed piston type indicated, to employ timed valve controlled gaseous fuel admission to the cylinder combustion space at a point therein adjacent to the pilot ignition fuel nozzle. Further, the timing of gaseous fuel admission in accordance with customary practice in such engines, is determined so that admission commences at a time in the compression cycle following closure of the exhaust ports, whereby to avoid diversion of gaseous fuel into the exhaust system. The above indicated prior practice introduces several disadvantages, one of which concerns mixture of gaseous fuel and charging air. It is known in uniflow scavenged engines of the form hereinabove noted, to direct the air ports such as to attain a helical flow or swirl of air through the cylinder to the exhaust ports in order to assure thorough sweep of the products of combustion into the exhaust system. Because the point of gaseous fuel admission is relatively remote from the air ports and since gaseous fuel admission occurs after exhaust port closure, it is not possible with such prior arrangements to take full advantage of the scavenging air swirl for effecting thorough mixing of gaseous fuel and air.

Another disadvantage is that the pressure of the gaseous fuel supply must be maintained at an appreciably high value, as greater than the compression pressure in the engine cylinder at the time of gaseous fuel admission after exhaust port closure. In a supercharged engine, as one having an exhaust gas driven turbocharger supplying air at above atmospheric pressure to the engine air ports, the cylinder pressure will be very substantially above atmospheric pressure at the time of gaseous fuel admission; hence necessitating fuel supply pressure adequately greater than such cylinder pressure to assure fuel admission.

Accordingly, the principal purpose of this invention is to provide a gaseous fuel admission arrangement particularly suitable for engines of the character indicated, which overcomes the aforementioned disadvantages.

A particular object of the invention is to afford a gaseous fuel admission arrangement having cylinder fuel port means disposed relative to the cylinder air ports such as to utilize the swirl of charging air established by the air ports, for effecting thorough mixing of fuel and air to improve fuel combustion.

Another particular object is to provide a gaseous fuel admission arrangement as indicated in the foregoing object, which will permit cylinder supply of gaseous fuel at a supply pressure materially less than pressures necessary for prior engines of similar type, as a supply pressure minimally greater than atmospheric pressure but not appreciably exceeding the pressure of charging air supply to the cylinder air ports.

Another particular object is to provide fluid pressure seal means in effective association with the gaseous fuel admission port means of the present invention, to prevent gaseous fuel leakage past the air port control piston to the engine crankcase.

The foregoing and other objects and advantages of this invention will appear from the following description of embodiments thereof as illustrated in the accompanying drawings, wherein:

FIG. 1 is a longitudinal sectional view of an engine embodying the present improvements, the engine illustration being partly diagrammatic;

FIG. 2 is an enlarged transverse section in the region of the cylinder air ports, as viewed along line 2—2 in FIG. 1;

FIG. 3 is a detail view taken from line 3—3 in FIG. 2, showing fuel port means;

FIG. 4 is a port timing diagram;

Figure 5:
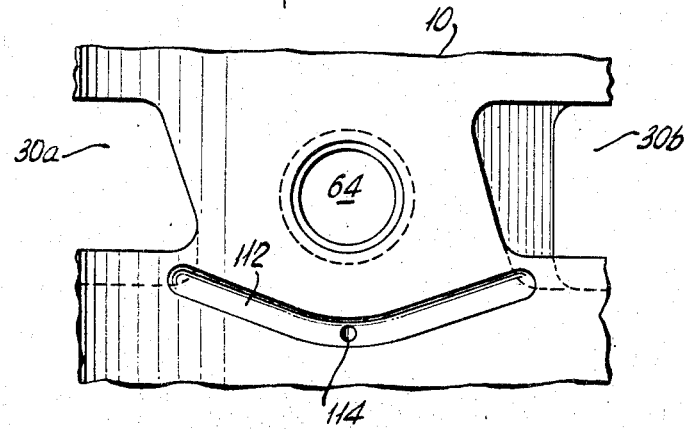
FIG. 5 is an enlarged detail view in the cylinder air port zone, illustrating a modification of the fuel leakage control provision shown in FIG. 1.

A preferred embodiment of the present invention is shown in application, by way of example, to a stepped cylinder opposed piston arrangement for a two cycle single or multi-cylinder engine of supercharged, uniflow scavenged character, as illustrated in FIG. 1. as there shown, the cylinder is comprised of two sections or cylinder liner members 10 and 11, liner 10 being of a given internal diameter and supported by main frame 12. Liner 11 coaxial with liner 10 and extending thereabove, has an internal diameter less than that of liner 10 to a predetermined extent and is carried in an upper frame 14. The lower end portion 15 of liner 11 is flanged outwardly to junction with upper end 16 of liner 10, forming a generally frusto-conical throat 18.

Operating in liner 10 is a piston 19 of correspondingly large diameter, having connecting rod 20 extending to a lower crankshaft indicated at 22. A small diameter piston 23 opposed to piston 19, operates in liner 11 and as indicated schematically, has its connecting rod 24 in operative connection to an upper crankshaft 26 through suitable linkage as rod 27 and rocker 28. The two crankshafts are interconnected by suitable gearing (not shown) while the rocker linkage to piston 23 is such as to determine the full travel of that piston at one-half the full travel of piston 19.

Formed in liner 10 are air admission ports 30 controlled by piston 19, these ports as shown in FIG. 2 being arranged in a series or band circumferentially of the liner. The ports further are all similarly directed angularly relative to the cylinder radial direction, for air admission generally tangentially into the liner as indicated by port-flow arrows 29 in FIG. 2, to establish a generally helical or spiral swirl flow upwardly through liners 10 and 11, as indicated at 31 in FIG. 1. The upper margins 32 of the air ports preferably are normal to the cylinder axis for precise port opening and closing control by piston 19, while the lower port margins 34 are inclined upwardly in the direction of the liner interior to direct air admission for upward swirl flow in the liner. Such upward flow is aided by the frusto-conical crown 35 of piston 19, the surface slope of which may be substantially the same as that of the port margins 34.

A circumferential series or band of exhaust ports 36 is provided in liner 11, under control by piston 23. These ports have lower margins 38 normal to the cylinder axis for precise opening and closure control by the piston 23. The upper port margins 39 are inclined upwardly and outwardly while the crown 40 of piston 23 has a shallow dome shape, as means for aiding exhaust discharge.

While the pistons 19 and 23 are shown in FIG. 1 at outer dead center positions in practice and as is well known in the art, port timing control may be attained through selected phase lead of one piston relative to the other in order to improve scavening and combustion. To such end it is usual to angularly relate the crankshafts so that the exhaust control piston 23 will have a desired lead relative to the air control piston 19.

As illustrated in FIG. 1, frame 12 cooperates with liner 10 to form a plenum chamber or manifold 42 for air supply to air ports 30, while frame 14 has collector passage means 43 open to the exhaust ports 36 for exhaust discharge at outlet 44. In the present engine example, exhaust discharge is conducted from outlet 44 over line 46 representing an exhaust manifold or deliver duct, to the intake of the turbine section 47 of a suitable turbocharger 48 having air compressor section 50 operated by the turbine section. Air under pressure output from compressor section 50 is delivered over line 51 representing a suitable conduit, to the plenum chamber 42 open to the engine air ports 30. Thus in the scavenging and charging cycle turbocharger supplied air in plenum chamber 42 passes through ports 30 and flows helically in and upwardly through line 10, entraining the products of combustion and continuing in swirl movement through throat 18 into the liner 11 toward and out the exhaust ports 36. The frusto-conical shape of throat 18 provides both clearance for the crown of piston 19 at inner dead center position, and a transfer nozzle to facilitate passage of air and products of combustion into liner 11 under continued swirl flow therein.

Referring now to FIGS. 1, 2 and 3 in respect to the gaseous fuel admission means according to the present invention, cylinder liner 10 is formed to provide a circumferentially extended rib 60 in the band of air ports 30 and between air ports 30a and 30b (FIG. 2). Rib 60 is counterbored to provide an outer bore 61 forming a mounting seat for the inner end of a fuel control valve housing 62, and a smaller diameter bore 64 open to the liner interior and constituting a fuel admission port. As illustrated particularly in FIG. 3, fuel port 64 has its bottom margin 65 substantially in the plane of the bottom margins of air ports 30 at the interior of the liner, while the port diameter preferably is such that its upper port margin 66 is substantially below the plane of the upper air port margins 32, for a purpose to appear.

Valve housing 62 which extends through plenum chamber 42, is suitably secured to frame 12 and carries therein a valve port member 68 providing port 69 under control of a poppet valve 70. The operating stem 72 of valve 70 is journaled in a bearing 73 forming part of valve body 74 which is assembled to valve housing 62, the stem projecting from the body and carrying a tappet head 76. Fixed on stem 72 is a collar 77, and between the collar and body 74 is a compression spring 78 normally biasing the poppet valve to closed position.

Timed operation of the fuel valve 70 is attained through a tappet assembly between valve tappet head 76 and a suitable cam 80 on a camshaft 81 which may be suitably driven (not shown) from upper crankshaft 26. Carried by frame part 82 of engine frame 12 is a tappet housing 84 which supports a first tappet rod 85 biased by spring 86 to retain its roller end 88 in constant engagement with cam 80, and a second tappet rod 89 biased by spring 90 to engage its upper flange end 92 with the lower end of tappet rod 85. Tappet rod 89 carries a tappet head 93, and between tappet head 93 and fuel valve tappet head 76 is a rocker 94 pivoted to housing 84. In the position of the parts as shown in FIG. 1, the fuel valve 70 appears in full-open position under tappet actuation by cam 80 having the high point of the cam lobe engaging the roller end 88 of tappet rod 85.

Gaseous fuel is supplied from a suitable source (not shown) through a supply manifold 96, the supply pressure in accordance with the present invention being relatively low, as not substantially exceeding the pressure of the engine charging air issuing through air ports 30. Branching from manifold 96 is a delivery conduit 97 communicating with intake passage 98 in valve body 74, the passage opening to the interior of valve casing 62 anterior to valve port 69.

FIG. 4 is a timing diagram presenting one example of port timing suitable to the engine as hereinabove described. While the illustrated timing sequence may be varied within limits, there is one particular criterion in respect of exhaust port closure timing, and such will be noted presently. Referring to FIGS. 1 and 4 and considering the lower crankshaft 22 rotating in the direction of arrow A in FIG. 4 at approximately 100 degrees of crank travel from the inner dead center position of piston 19, representing the combustion and expansion cycle, the exhaust control piston 23 begins uncovering of the exhaust ports 36. Exhaust discharge then commences, and at 130 degrees of crank travel the piston 19 begins opening of the air ports 30. At about 170 degrees of crank travel, piston 19 attains a position of near full-open condition of the air ports and the gaseous fuel port 64. At this point the cylinder inflow of scavenging and charging air is well established in helical or swirl flow toward the exhaust ports, and in accordance with the present invention, gaseous fuel is now admitted. The setting of the gas valve cam 80 is such that it operates the tappet mechanism to open and hold open the gas valve 70 in the crank travel range from 170 degrees to 230 degrees. At the latter point the cam 80 releases the gas valve to spring effected closure, while the piston 19 then closes the air ports 30.

As will be now appreciated from the foregoing, with location of the fuel admission port 64 directly in the band of air ports 30 and admission of gaseous fuel timed to occur relatively early in the air charging cycle when the scavenging and charging air swirl is well established in the cylinder, the air swirl is thereby fully utilized to promote a desirable high degree of gaseous fuel and air mixing for more efficient combustion. Moreover and because scavenging is advanced upstream of the air ports at the time of gaseous fuel admission, the fuel-air mixture will be relatively free of contamination by products of combustion. While indicated hereinbefore, the present fuel admission arrangement affords an additional material advantage in that it requires only relatively low pressure gaseous fuel supply to the engine. The supply pressure while necessarily above atmospheric pressure to assure positive delivery flow to the fuel port 64, need not be greater than the pressure of the charging air issuing into the cylinder through the air ports 30.

It will be observed in FIG. 3 that since in the present example the top side 66 of port 64 is below the plane of the top edges 32 of the air ports, piston 19 will close port 64 ahead of air port closure. Where the cam 80 is set to cause gas valve closure coincident with piston closure of the air ports, provision is here made to permit continued gaseous fuel admission after piston closure of port 64 and at least until piston closure of the air ports. Such provision is found in the recess 100 formed in the internal surface of liner 10, the recess being open to port 64 and extending to an upper cut-off margin 101 which may lie in the plane of the upper edges 32 of the air ports 30. However and as illustrated in FIGS. 1 and 3 according to the present example, the recess is extended such as to have its cut-off margin 101 in predetermined limited distance above the plane of air port edges 32, whereby to afford gaseous fuel admission following the immediate point of air port closure by piston 19, and until the piston covers the recess margin 101. In this instance the cam 80 may be adapted as through profile design thereof, to cause closure of the gas valve 70 approximately at the time of piston coverage of the recess margin 101. Thus the recess 100 affords a means for predetermining gaseous fuel admission cut-off timing according to the location of the recess margin 101.

Referring further to FIGS. 1 and 4, at the 230 degree point of crank travel (effecting air port closure) the exhaust ports 36 are not yet closed by piston 23, so that exhaust discharge is then continuing. However, exhaust discharge after closure of the air ports and cut-off of fuel admission, is only for a very short period, the exhaust ports 36 being closed by piston 23 at the 240 degree point of crank travel according to the present example. Some delay in exhaust port closure is desirable to assure more complete scavenging, yet the delay period in relation to the time of air port closure, must be sufficiently short to preclude discharge of gaseous fuel and air mixture through the exhaust ports. It is appreciated, of course, that to allow passage of fuel-gas mixture into the engine exhaust system would present not only loss of fuel but a very distinct danger of combustion or explosion in the system. In respect to the present exemplary embodiment of FIG. 1 having air charging, exhaust and fuel timing as illustrated in the timing of diagram of FIG. 4, it is found that the indicated ten degrees of crank travel following air port closure and to the point of exhaust port closure, is sufficient to prevent loss of air-fuel mixture through the exhaust ports.

Included in the present improvements is a seal means in association with the fuel port 64, provided to prevent leakage of gaseous fuel past piston 19 into the engine crankcase region 105 (FIG. 1). The seal means as shown in FIGS. 1, 2 and 3, comprises a circular recess 106 formed in liner 10 and opening to the liner interior, extending about the fuel port 64 in suitably spaced relation thereto (FIG. 3). As appears in FIG. 1, the lower portion or section 107 of the recess is at all times covered by piston 19. High pressure fluid, which may be air taken from the high pressure engine starting air source (not shown), is delivered by conduit 108 to a passage 110 formed in liner 10, the passage opening to the seal recess preferably at the midpoint of the recess section 107. Such supply of air to the recess is constant during engine operation, the pressure air being distributed by the recess to form an air seal against gas fuel leakage to the crankcase. Since the seal fluid pressure is very materially greater than the pressure of the gaseous fuel, the seal fluid presents an effective fluid curtain for the indicated purpose.

As illustrated in FIG. 5, the leakage seal means may take the form there shown. In this modification, the liner 10 is provided with an angulate recess 112 below the plane of the lower margins of air ports 30 so as to be at all times covered by the piston 19. The recess preferably of the shape shown, is of an extent or length to span the air ports 30a and 30b on opposite sides of fuel port 64, with the ends of the recess overlapping the indicated air ports. High pressure fluid is delivered to the recess at its midpoint, as at supply port 114.

Figure 6:
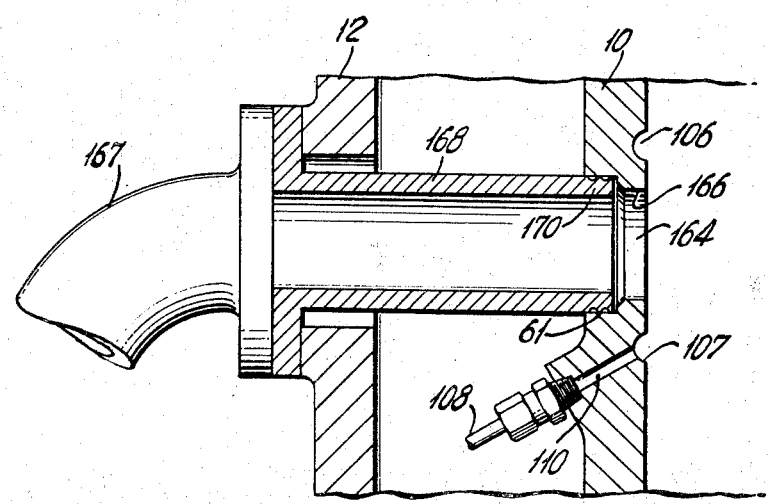
FIG. 6 is an enlarged fragmentary view of the cylinder in the air port region, illustrating a modified form of fuel admission means.

Referring now to FIG. 6, here shown is a modification of the fuel delivery control according to FIG. 1, which may be employed where it is desired to utilize piston 19 as the sole valving means for determining fuel admission and cut-off, and thereby eliminate the separate cam operated poppet valve provision of FIG. 1. Fuel port 164 corresponds to port 64 in its location in the air port band (FIG. 3), the only difference over the arrangement shown in FIG. 3 being that in this modification the liner recess 100 is eliminated in order to utilize the upper port margin 166 (corresponding to margin 66 in FIG. 3) as the point of reference in piston control of port opening and closing. Gaseous fuel from supply header or manifold 96 (FIG. 1) is here delivered by branch conduit 167 directly to a tube form adapter 168 suitably mounted to frame 12 and having its inner end 170 in the liner recess 61 anterior to fuel port 164. Thus it will be apparent with reference to FIG. 3 showing the fuel port location, that fuel admission commences as the piston 19 in movement toward outer dead center uncovers the port in its upper marginal region 166, and that such fuel port opening takes place after the piston has partly uncovered the air ports. Hence, full advantage is taken of the then established air swirl adjacent the air ports (on the upstream side), to effect thorough gaseous fuel and air mixing for improved combustion. Upon piston movement in the port closing direction, piston 19 will close fuel port 164 ahead of air port closure. Except for the advanced closure of the fuel port, the timing cycle of events respecting fuel admission and air and exhaust port control, may be substantially in accordance with the timing diagram example of FIG. 4.

Included in the modification according to FIG. 6 is leakage seal means which in present illustration, is identical to the showing in FIGS. 1 and 3. However, if preferred, the seal arrangement as shown in FIG. 5 may be used.

Having now described and illustrated the invention according to a presently preferred embodiment and modifications thereof, it is to be understood that the forms shown are exemplary only, in that further alterations and modifications may be made thereto without departing from the spirit and scope of the invention as hereinafter claimed.

We claim:

1. In an internal combustion engine of opposed piston type, providing a cylinder having a circumferential series of air ports controlled by one piston and exhaust ports controlled by the other piston, said air ports being directed for effecting air flow in helical swirl trend in the cylinder toward the exhaust ports, a gaseous fuel admission port in the cylinder between an adjacent pair of air ports and controlled by said one piston, said fuel port being disposed relative to the air ports to be uncovered by said one piston following partial opening of the air ports by said one piston in its displacement toward outer dead center, gaseous fuel supply means for said fuel port including a fuel supply control valve, and valve operating means driven by the engine, arranged to open said valve following said partial piston opening of the air ports, for admitting gaseous fuel through the fuel port into the then established helical swirl of air in the cylinder upstream from the air ports.

2. In an engine according to claim 1, wherein the said air ports have the end margins thereof nearer the exhaust ports in a common plane transverse to the cylinder axis, and wherein the said cylinder includes passage means communicating with the said gaseous fuel admission port and opening to the cylinder interior beyond said plane of the air port end margins in the direction of the said exhaust ports.

3. In an internal combustion engine having a cylinder, a crankcase, a crankshaft in the crankcase, and a piston operable in the cylinder and operatively connected to the crankshaft, said cylinder having a plurality of air admission ports controlled by the piston, means for supplying gaseous fuel under relatively low pressure to the cylinder, said means including a fuel admission port between an adjacent pair of air ports, and means for preventing gaseous fuel leakage from said fuel port past said piston to said crankcase, comprising a channel extending in an internal wall portion of the cylinder in a zone thereof between said fuel port and the crankcase end of the cylinder, wherein at least a portion of said channel is covered at all times by the piston, and means for supplying fluid under a pressure greater than the gaseous fuel pressure, to said channel.

4. In an internal combustion engine according to claim 3 wherein the said channel is of circular trend extending at least part way around the said fuel port.

References Cited

UNITED STATES PATENTS

| 724,333 | 3/1903 | Rogler | 123—51 |
| 2,232,841 | 2/1941 | Dickson | 123—27 |
| 2,686,503 | 8/1954 | Reddy et al. | 123—27 |
| 2,767,691 | 10/1956 | Mengelkamp et al. | 123—27 |

FOREIGN PATENTS

| 7,515 | 1909 | Great Britain. |
| 335,533 | 4/1921 | Germany. |
| 520,131 | 2/1921 | France. |

WENDELL E. BURNS, *Primary Examiner.*